United States Patent
O'Dell et al.

(10) Patent No.: US 12,079,114 B2
(45) Date of Patent: Sep. 3, 2024

(54) IMPACT ANALYSIS BASED ON API FUNCTIONAL TESTING

(71) Applicant: salesforce.com, inc., San Francisco, CA (US)

(72) Inventors: Robert M. O'Dell, Bellevue, WA (US); Nicolas Hernan Battiato, Buenos Aires (AR); Diego Larralde, Buenos Aires (AR); Ignacio Agustin Manzano, Buenos Aires (AR)

(73) Assignee: Salesforce.Com, Inc., San Francisco, CA (US)

( * ) Notice: Subject to any disclaimer, the term of this patent is extended or adjusted under 35 U.S.C. 154(b) by 0 days.

(21) Appl. No.: 17/589,604

(22) Filed: Jan. 31, 2022

(65) Prior Publication Data
US 2023/0088970 A1 Mar. 23, 2023

Related U.S. Application Data (60) Provisional application No. 63/246,223, filed on Sep. 20, 2021.

(51) Int. Cl.
*G06F 11/30* (2006.01)
*G06F 11/36* (2006.01)
(Continued)

(52) U.S. Cl.
CPC ...... *G06F 11/3688* (2013.01); *G06F 16/9024* (2019.01); *G06N 5/04* (2013.01); *G06N 20/00* (2019.01)

(58) Field of Classification Search
CPC ... G06F 11/3688; G06F 16/9024; G06N 5/04; G06N 20/00
See application file for complete search history.

(56) References Cited

U.S. PATENT DOCUMENTS 10,437,712 B1 * 10/2019 Tyler .................. G06F 11/3684
10,990,516 B1 * 4/2021 Merritt ............... G06F 11/3692

FOREIGN PATENT DOCUMENTS

WO WO-2021253904 A1 * 12/2021 .......... G06F 11/3684

OTHER PUBLICATIONS

T. Takeda et al. "Applying Change Impact Analysis Test to Migration Test Case Extraction Based on IDAU and Graph Analysis Techniques," 2019 IEEE International Conference on Software Testing, Verification and Validation Workshops (ICSTW), Xi'an, pp. 131-139. (Year: 2019).*

(Continued)

*Primary Examiner* — Hanh Thi-Minh Bui
(74) *Attorney, Agent, or Firm* — Sterne, Kessler, Goldstein & Fox P.L.L.C.

(57) ABSTRACT

Disclosed herein are system, method, and computer program product embodiments for self-paced migration of an application programming language (API) gateway. An embodiment operates by receiving a functional test suite corresponding to an application programming interface (API). The embodiment generates a knowledge graph of information by combining a test result graph of information based on a result of execution of one or more tests in the functional test suite with a metadata linked graph of information based on metadata corresponding to the one or more APIs. The embodiment then generates an alert message corresponding to the function test suite based on the knowledge graph of information.

14 Claims, 5 Drawing Sheets

(51) Int. Cl.
*G06F 16/901* (2019.01)
*G06N 5/04* (2023.01)
*G06N 20/00* (2019.01)

(56) References Cited

OTHER PUBLICATIONS

A. Pasala, S. Rao, S. Gunturu and P. Sinha, "An Approach Based on Modeling Dynamic Behavior of the System to Assess the Impact of COTS Upgrades," 2006 13th Asia Pacific Software Engineering Conference (APSEC'06), Bangalore, India, 2006, pp. 19-26. (Year: 2006).*

* cited by examiner

IMPACT ANALYSIS BASED ON API FUNCTIONAL TESTING

CROSS-REFERENCE TO RELATED APPLICATIONS

This application claims the benefit of U.S. Provisional Patent Application No. 63/246,223 by O'Dell, et al., titled "IMPACT ANALYSIS BASED ON API FUNCTIONAL TESTING," filed on Sep. 20, 2021, which is incorporated by reference herein in its entirety.

BACKGROUND

One or more implementations relate to the field of Application Programming Interfaces (APIs), and more specifically, to performing impact analysis based on API functional testing.

As connectivity between computer and mobile devices continues to develop, applications have been developed that communicate and share information. Commonly, applications may communicate via an Application Programming Interface (API). An API is a software interface offering a service to other programs to communicate data. To describe or standardize the communication protocol for an API, API developers provide an API specification. The API specification details how to use or interface with an API for communication. For example, the API specification may define API objects, values and parameters, how the API objects are called, and what each object does. The API specification may also indicate relationships between the objects and how each object can be used. A computer system that utilizes this specification is said to implement or expose an API.

An API specification is often defined in languages such as representational state transfer (REST) API Modeling Language (RAML), OpenAPI Specification (OAS), GraphQL, or gRPC Remote Procedure Call format. Testing a REST web service API is commonly handled by generating test suites, commonly with tools such as Apache JMeter, JUnit, or Blackbox API Tester (BAT). An objective of API functional testing is to ensure that an API does what it is supposed to do and returns the data it is expected to return. However, assets related to various API specifications are not linked in a test developer's asset ecosystem. As a result, faulty assets that potentially cause a functional test to fail cannot be identified in advance.

Accordingly, what is needed are tools for identifying and linking assets corresponding to API functional tests.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing impact analysis based on API functional testing.

In order to test REST APIs, a testing framework such as Apache JMeter (for example) may be used to write tests, as well as to compile multiple tests into a test suite. A testing framework allows for connection to a service, such as a RESTful web service, and the sending of requests to the service in order to receive a response. An API functional testing involves determining whether an API does what it is supposed to do and returns the data it is expected to return. REST API testing frameworks allow for robust implementation of tests and test suites. However, assets related to various API specifications are not linked in a test developer's asset ecosystem. As a result, faulty assets that potentially cause a functional test to fail cannot be identified in advance.

In some embodiments, a test developer may use information related to functional test definitions and metadata corresponding to test suite execution to identify functional relationships between various assets in a test developer's asset ecosystem. The test developer may use information regarding functional connections between various assets to determine beforehand whether a faulty asset in the ecosystem may cause a particular functional test to fail. Such an ability to determine beforehand whether a test would fail or succeed would substantially improve API functional monitoring and testing process efficiency.

Embodiments disclosed herein provide structures and functions to identify and store information regarding functional relationships among various assets in the form of a knowledge graph.

Figure 1:
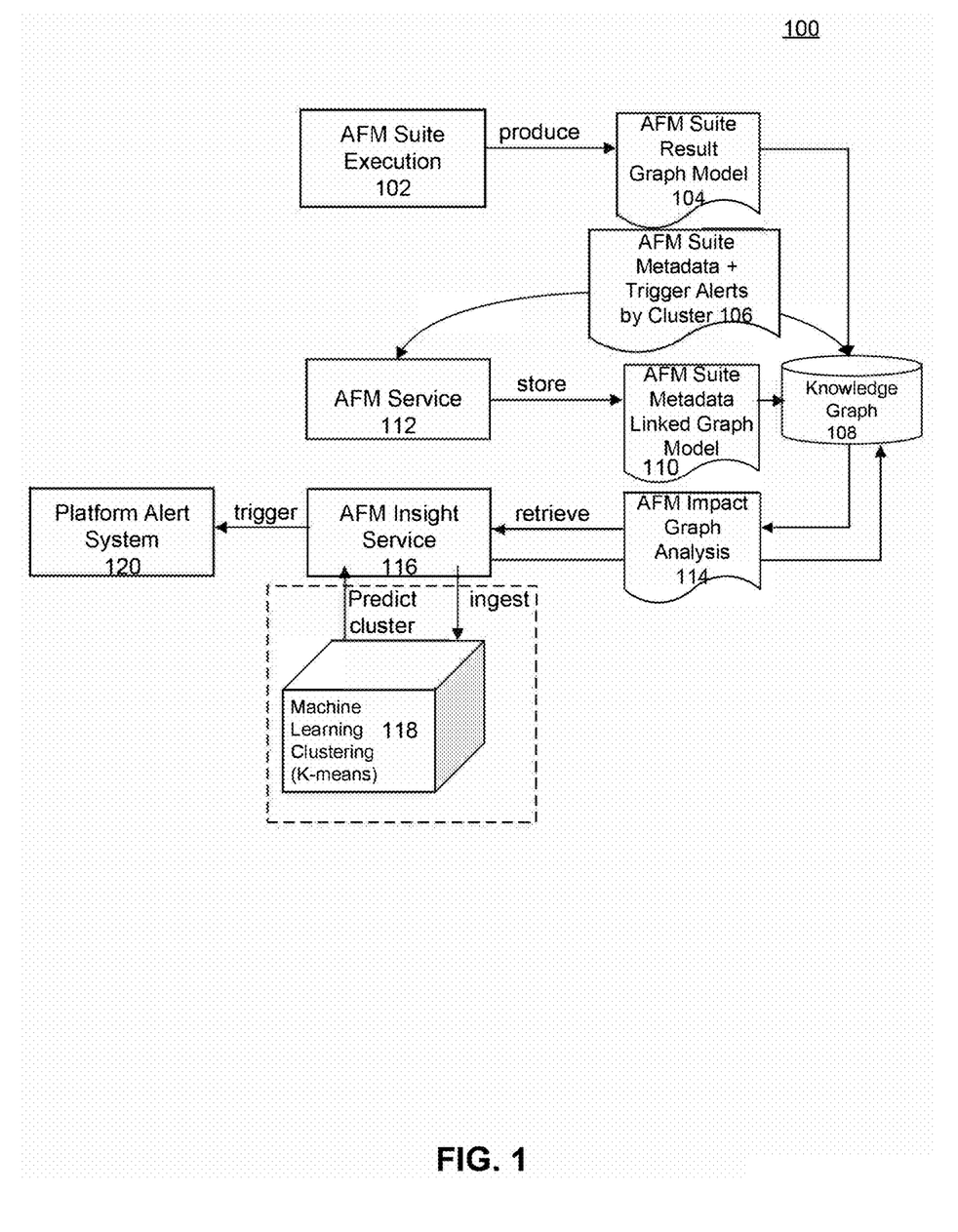
FIG. 1 is a block diagram of an API functional monitoring system for facilitating impact analysis based on API functional testing, according to some embodiments.

FIG. 1 illustrates a block diagram of an API functional monitoring (AFM) system 100 for facilitating impact analysis based on API functional testing, according to some embodiments. AFM system 100 includes AFM suite execution module 102, AFM, Knowledge graph module 108, AFM service module 112, AFM insight service module 116, machine learning module 118, and platform alert system 120. AFM system 100 may be implemented using computer system 500 as further described with reference to FIG. 5.

In some embodiments, AFM suite execution module 102 receives a functional test suite corresponding to one or more APIs. A functional test suite may comprise several functional tests corresponding to a specification of an APT Each functional test may correspond to the testing functionality of an endpoint of an API. In some embodiments, a functional test suite may be identified by a unique AFM suite identifier and each test of the test suite may be associated with a unique test identifier. In some embodiments, AFM suite execution model 102 may execute one or more tests of the functional test suite and gather information corresponding to the execution result of each test.

In some embodiments, AFM suite result graph model 104 generates a test-result graph based on results of executing one or more tests of the functional test suite. In some embodiments, the test-result graph may comprise multiple test-result subgraphs, with each subgraph corresponding to a test of the functional test suite, an endpoint of an API on which the test is executed, and the result of the test. The result of the test may be a pass, fail, or another indicator of the result. In some embodiments, a test-result graph of information identifies the APIs that failed one or more of the executed functional tests and the API endpoint on which the tests.

In some embodiments, AFM service module 112 receives a specification corresponding to an API and extracts metadata corresponding to the specification and the API. In some embodiments, metadata extracted for a specification of an API may include an API specification identifier, a version identifier, and a runtime identifier. In some embodiments, when a specification of an API is updated, AMF service 112 retrieves API metadata about the specification and adds it to the metadata-linked graph with an incremented specification version identifier. In some embodiments, when a new API is published, AFM service model 112 extracts metadata for that API and adds it to the metadata-linked graph. In some embodiments, a runtime identifier acts as a temporal identifier or a timestamp of the time at which a test of the functional test suite is executed in the runtime.

In some embodiments, the AFM suite metadata graph model 110 generates the metadata-linked graph based on metadata extracted by AFM service module 112 based on the specification of the API. In some embodiments, a metadata-linked subgraph may comprise multiple metadata-linked subgraphs, with each metadata-linked subgraph corresponding to a specification of the API, and the specification is as assigned an identifier (for example, an API group asset identifier) and version identifier. Further, metadata-inked subgraph may be associated with a runtime identifier (for example, a deployment identifier). In some embodiments, metadata extracted for a specification of an API may include an API specification identifier, a version identifier, and a runtime identifier. In some embodiments, runtime identifier acts as temporal identifier or a time stamp of when a test of the functional test suite is executed in the runtime.

In some embodiments, a knowledge graph 108 is generated by aggregating test-result graphs of information based on the results of execution of one or more tests of the functional test suite with a metadata-linked graph of information based on metadata corresponding to the API. In some embodiments, a knowledge graph of information may be a database comprising several subgraphs. Each subgraph of knowledge graph 108 may comprise one or more of the following as nodes of the subgraph: a test identifier and an AFM test suite identifier, a test identifier, an API key, an API identifier and an API specification version identifier, and a runtime identifier.

In some embodiments, AFM impact graph 114 may generate a graph of information corresponding to the APIs that failed one or more of the executed functional tests and the API endpoint on which the tests. The AFM impact graph 114 identifies interconnected subgraphs of knowledge graph 108 that correspond to the failed tests of the AFM test suite.

In some embodiments, AFM insight service module 116 provides insight as to whether a faulty asset in the ecosystem may impact a particular functional test suite, according to some embodiments. According to some embodiments, AFM insight service 116 employs a machine-learning algorithm 118 to perform clustering of various assets and test cases. AFM insight service 116 can trigger a platform alert system to generate an alert based on the impact graph information. For example, an alert may be generated to alert the test developer that a particular test will fail due to a faulty asset in the ecosystem.

In some embodiments, generating an alert message involves identifying a knowledge subgraph related to a failed test. In some embodiments, results corresponding to failed tests of the functional test suite are ingested into a machine-learning algorithm, and alert messages corresponding to failed tests can be classified by the machine learning algorithm. In some embodiments, a machine-learning algorithm may use clustering techniques, such as a k-means clustering algorithm, to categorize the alerts. Clustering can be performed, for example, based on security attributes corresponding to the test cases. For example, an alert may be classified as a critical issue alert, security issue alert, or service outage alert. Further, the machine learning algorithm may categorize tests based on a test corresponding to production, security, or system management.

Figure 2:
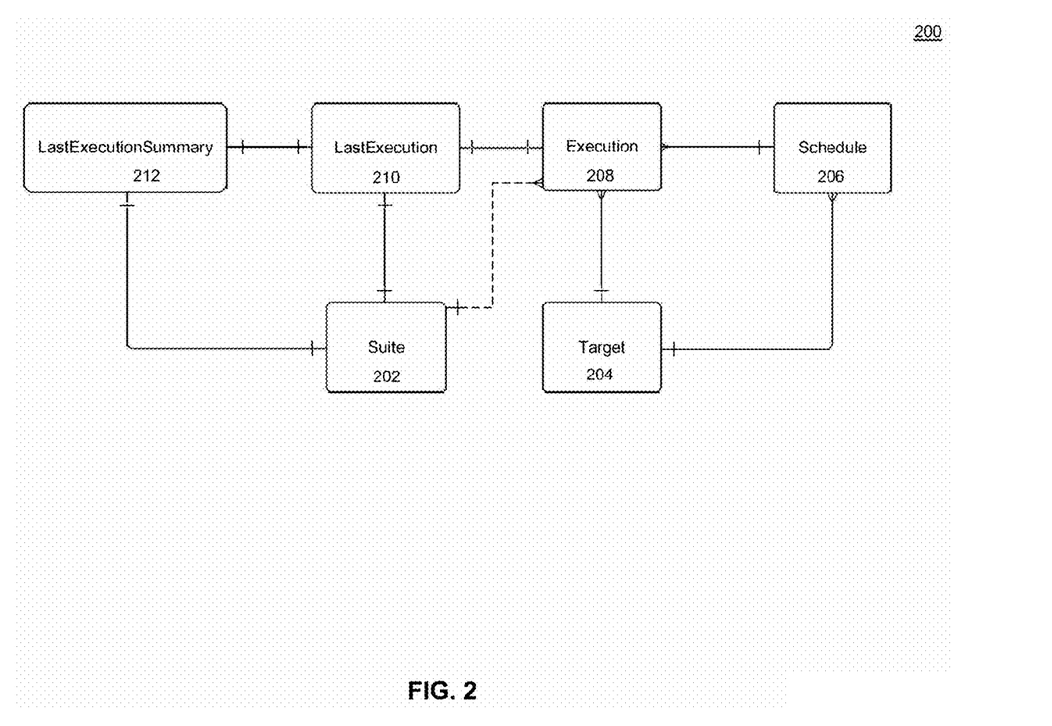
FIG. 2 illustrates an entity-relationship diagram of an API functional monitoring (AFM) execution model, according to some embodiments.

FIG. 2 illustrates an entity-relationship diagram of an AFM execution model, according to some embodiments. The main entities of the AFM execution model are suite module 202, target module 204, schedule module 206, execution module 208, last execution module 210, and last execution summary module 212. In some embodiments, suite module 202 provides definitions of functional tests of a test suite. Suite module 202 interacts with last execution module 210 and last executed summary module 212. Information regarding the last executed function test may be stored in last execution module 210. In addition, a summary of the functional test results may be stored in last execution summary module 212. Further, suite module 202 may optionally interact with the execution module 208. Suite module 202 and execution module 208 may be associated with a common GAV key. Execution module 208 performs execution of the functional tests defined by suite module 202. The tests executed by execution module 208 may be performed over one or more targets specified by target module 204, For example, target module 204 may specify an endpoint of an API over which a function test is executed. Execution module 208 has a many-to-one association with target module 204 and schedule module 206. Schedule module specifies how often a functional test will be executed by execution module 208. For example, functional over an endpoint can be scheduled for execution on a periodical basis.

Figure 3:
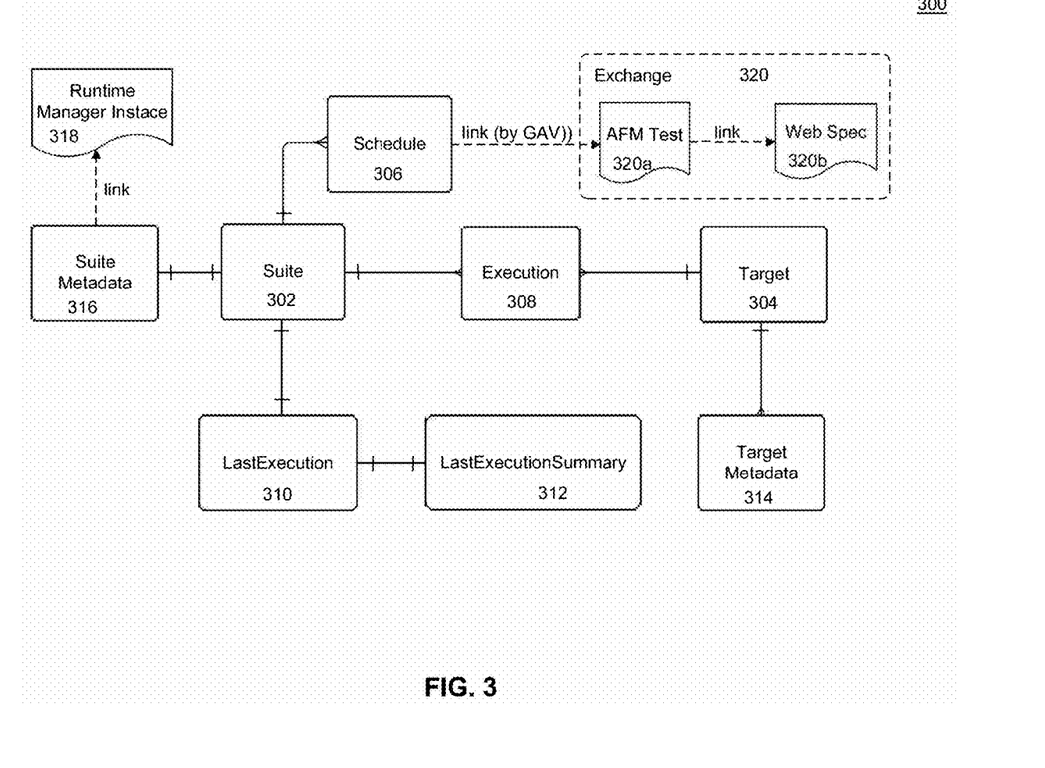
FIG. 3 illustrates an entity-relationship diagram of an AFM domain model, according to some embodiments.

FIG. 3 illustrates an entity-relationship diagram of an AFM domain model, in accordance with some embodiments. In some embodiments, exchange module 320 is an asset catalog for the AFM domain model. Information regarding various AFM tests parameters and related assets may be stored in exchange module 320. For example, AFM test module 320a may maintain information regarding the test that is being performed on an asset and web spec module 320b maintains information regarding specification that describes the asset. The AFM execution model of FIG. 2 interfaces with exchange module 320 via a GAV link, in accordance with some embodiments. In accordance with some embodiments, as described earlier, AFM execution model comprises suite module 302, target module 304, schedule module 306, execution module 308, last execution module 310, and last execution summary module 312.

Target module 304 interfaces with target metadata module 314. Target metadata module may maintain metadata corresponding to one or more targets specified by the target module 304. For example, if a test corresponds to a HTTP API, target metadata comprises information regarding one or more URLs corresponding to the HTTP API. In accordance with some embodiments, metadata regarding an application may comprise a version, name, or an ID number of the application. Further, target metadata module defines a key-value structure, and maintains specific metadata corresponding to a target such as timeout and tags information. Suite module 302 interfaces with a suite metadata module 316, which is linked to a runtime manager instance 318. Suite metadata module 316 maintains metadata corresponding to the one or more functional test suites that are defined by suite module 302.

Figure 4:
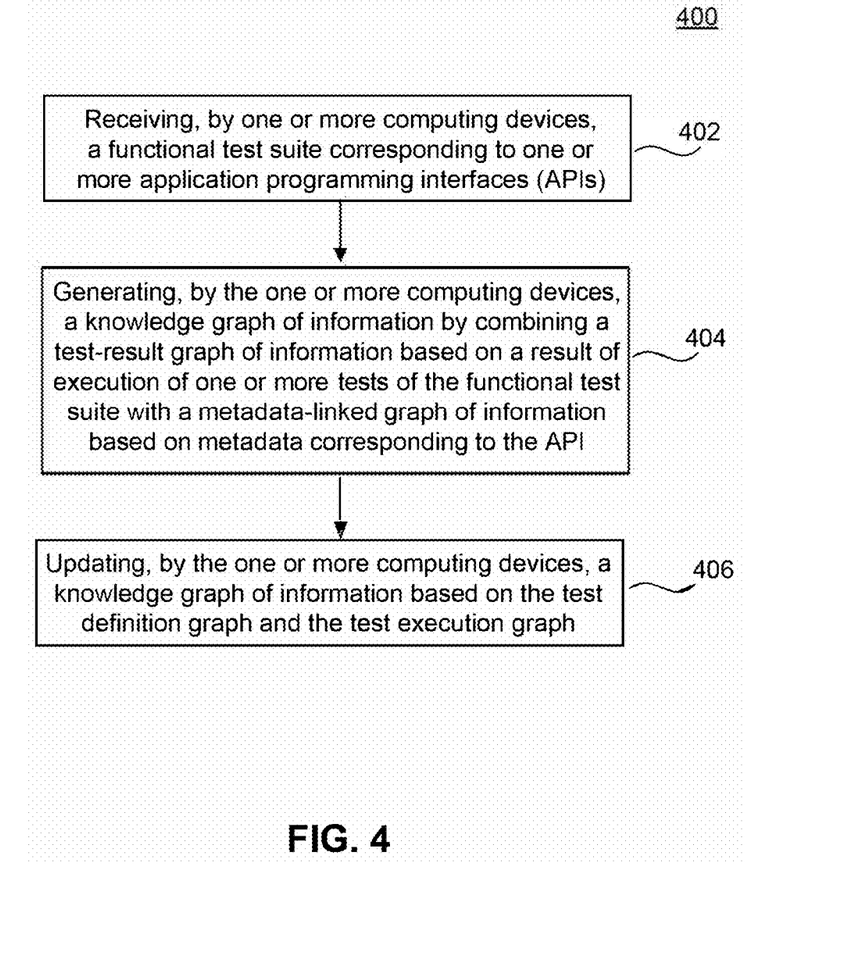
FIG. 4 is a flow chart illustrating steps by which a knowledge graph corresponding to an API functional test suite can be generated, according to some embodiments.

FIG. 4 is a flow chart illustrating steps by which a knowledge graph corresponding to an API functional test suite can be generated, according to some embodiments. In accordance with an embodiment, these steps are performed by an API functional monitoring system, such as the AFM suite execution module 102 in FIG. 1. However, one skilled in the relevant arts will appreciate that these steps may be performed by any combination of software and/or hardware components.

At 402, a functional test suite corresponding to an API is received may be received by an AFM suite execution module 102. The functional test suite may comprise several test corresponding to a specification of the API. In some embodiments, a unique test identifier may identify each test of the functional test suite. In some embodiments, AFM suite execution model 102 may execute one or more tests of the functional test suite and gather information corresponding to the execution result of each test.

At 404, a knowledge graph of information 108 is generated by combining a test-result graph of information based on a result of execution of one or more tests of the functional test suite with a metadata-linked graph of information based on metadata corresponding to the API. In some embodiments, the test-result graph may be generated by AFM suite result graph model 104 based on results of executing one or more tests of the functional test suite. In some embodiments, the test-result graph may comprise multiple test-result subgraphs, with each subgraph corresponding to a test of the functional test suite, an endpoint of an API on which the test is executed, and the result of the test. The result of the test may be a pass, fail, or another indicator of the result. In some embodiments, the AFM suite metadata graph model 110 generates the metadata-linked graph based on metadata extracted from the specification of the API. In some embodiments, a metadata-linked subgraph may comprise multiple metadata-linked subgraphs, with each metadata-linked subgraph corresponding to a specification of the API, and the specification is as assigned an identifier (for example, an API group asset identifier) and version identifier. Further, metadata-inked subgraph may be associated with a runtime identifier (for example, a deployment identifier). In some embodiments, metadata extracted for a specification of an API may include an API specification identifier, a version identifier, and a runtime identifier. In some embodiments, a runtime identifier acts as temporal identifier or a time stamp of when a test of the functional test suite is executed in the runtime.

At 408, an alert message corresponding to the functional test suite is generated by platform alert system 120 based on the knowledge graph. In some embodiments, generating an alert message involves identifying a knowledge subgraph related to a failed test. In some embodiments, results corresponding to failed tests of the functional test suite are ingested into a machine-learning algorithm, and alert messages corresponding to failed tests can be classified by the machine learning algorithm. In some embodiments, a machine-learning algorithm may use clustering techniques, such as a k-means clustering algorithm, to categorize the alerts. For example, an alert may be classified as a critical issue alert, security issue alert, or service outage alert.

Further, the machine learning algorithm 118 may categorize tests based on a test corresponding to production, security, or system management.

The method steps of FIG. 4 may be performed in any conceivable order and it is not required that all steps be performed. Moreover, the method steps of FIG. 4 described above merely reflect an example of steps and are not limiting. That it, further method steps and functions may be envisaged based upon embodiments described in reference to FIGS. 1, 2, 3, and 5.

Figure 5:
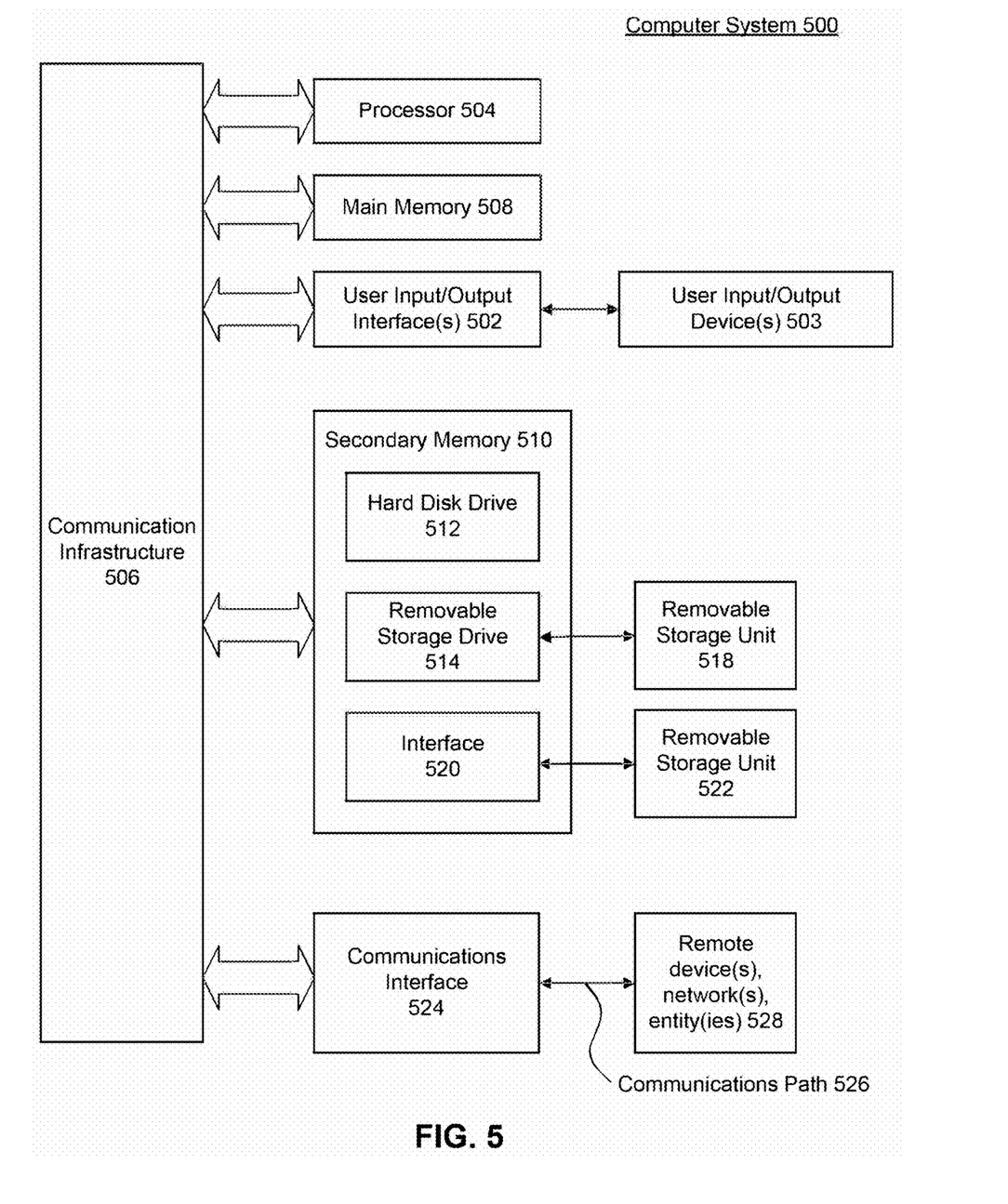
FIG. 5 is an example computer system useful for implementing various embodiments.

Various embodiments can be implemented, for example, using one or more well-known computer systems, such as computer system 500 shown in FIG. 5. One or more computer systems 500 can be used, for example, to implement any of the embodiments discussed herein, as well as combinations and sub-combinations thereof.

Computer system 500 can include one or more processors (also called central processing units, or CPUs), such as a processor 504. Processor 504 can be connected to a communication infrastructure or bus 506.

Computer system 500 can also include customer input/output device(s) 503, such as monitors, keyboards, pointing devices, etc., which can communicate with communication infrastructure 506 through customer input/output interface(s) 502.

One or more of processors 504 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 can also include a main or primary memory 508, such as random access memory (RAM). Main memory 508 can include one or more levels of cache. Main memory 508 can have stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 can include a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 can read from and/or write to removable storage unit 518.

Secondary memory 510 can include other means, devices, components, instrumentalities or other approaches for allowing computer programs and/or other instructions and/or data to be accessed by computer system 500. Such means, devices, components, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 can enable computer system 500 to communicate and interact with any combination of external devices, external networks, external entities, etc. (individually and collectively referenced by reference number 528). For example, communication interface 524 can allow computer system 500 to communicate with external or remote devices 528 over communications path 626, which can be wired and/or wireless (or a combination thereof), and which can include any combination of LANs, WANs, the Internet, etc. Control logic and/or data can be transmitted to and from computer system 500 via communication path 526.

Computer system 500 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A computer-implemented method, comprising:
receiving, by one or more computing devices, a functional test suite corresponding to an application programming interface (API);
generating, by the one or more computing devices, a knowledge graph of information by combining a test-result graph of information based on a result of execution of a test of the functional test suite with a metadata-linked graph of information based on metadata corresponding to the API, wherein the metadata-linked graph comprises a plurality of metadata-linked subgraphs associated with a respective runtime identifier indicating a time stamp of when a respective test of the functional test suite is executed; and generating, by the one or more computing devices, an alert message corresponding to the function test suite based on the knowledge graph of information, wherein the generating the alert message comprises identifying a knowledge subgraph corresponding to a failed test of the functional test suite, and determining a classification of the alert message using a machine-learning algorithm based on the knowledge graph.

2. The computer-implemented method of claim 1, wherein the test-result graph comprises a test-result subgraph corresponding to the result of execution of the test of the functional test suite on an endpoint of the API.

3. The computer-implemented method of claim 1, wherein the metadata-linked graph comprises the metadata-linked subgraph corresponding to a specification of the API associated with a specification identifier and a version identifier.

4. The computer-implemented method of claim 3, wherein the metadata-linked subgraph is associated with the runtime identifier.

5. The computer-implemented method of claim 1, wherein the generating the knowledge graph of information further comprises:
   receiving an updated specification of the API; and
   generating a new metadata-linked subgraph corresponding to the updated specification of the API.

6. A system, comprising:
   a memory; and
   at least one processor coupled to the memory and configured to:
   receive a functional test suite corresponding to an application programming interface (API);
   generate a knowledge graph of information by combining a test result graph of information based on a result of execution of a test in the functional test suite with a metadata linked graph of information based on metadata corresponding to the API, wherein the metadata-linked graph comprises a plurality of metadata-linked subgraphs associated with a respective runtime identifier indicating a time stamp of when a respective test of the functional test suite is executed; and
   generate an alert message corresponding to the function test suite based on the knowledge graph of information by identifying a knowledge subgraph corresponding to a failed test of the functional test suite, and determining a classification of the alert message using a machine-learning algorithm based on the knowledge graph.

7. The system of claim 6, wherein the test-result graph comprises a test-result subgraph corresponding to the result of execution of the test of the functional test suite on an endpoint of the API.

8. The system of claim 6, wherein the metadata-linked graph comprises the metadata-linked subgraph corresponding to a specification of the API associated with a specification identifier and a version identifier.

9. The system of claim 8, wherein the metadata-linked subgraph is associated with the runtime identifier.

10. The system of claim 6, wherein to generate the knowledge graph of information, the at least one processor is further configured to:
    receive an updated specification of the API; and
    generate a new metadata-linked subgraph corresponding to the updated specification of the API.

11. A non-transitory computer-readable medium (CRM) having instructions stored thereon that, when executed by at least one computing device, causes the at least one computing device to perform operations comprising:
    receiving a functional test suite corresponding to an application programming interface (API);
    generating a knowledge graph of information by combining a test result graph of information based on a result of execution of a test in the functional test suite with a metadata linked graph of information based on metadata corresponding to the API, wherein the metadata-linked graph comprises a plurality of metadata-linked subgraphs associated with a respective runtime identifier indicating a time stamp of when a respective test of the functional test suite is executed; and
    generating an alert message corresponding to the function test suite based on the knowledge graph of information, wherein the generating the alert message comprises identifying a knowledge subgraph corresponding to a failed test of the functional test suite, and determining a classification of the alert message using a machine-learning algorithm based on the knowledge graph.

12. The non-transitory CRM of claim 11, wherein the test-result graph comprises a test-result subgraph corresponding to the result of execution of the test of the functional test suite on an endpoint of the API.

13. The non-transitory CRM of claim 11, wherein the metadata-linked graph comprises the metadata-linked subgraph corresponding to a specification of the API associated with a specification identifier and a version identifier.

14. The non-transitory CRM of claim 13, wherein the metadata-linked subgraph is associated with the runtime identifier.

* * * * *